Jan. 11, 1966  F. S. COPPOLA  3,228,488
SCALE WITH INDEX MEANS FOR DETERMINING WEIGHT OF MATERIAL
REMOVED FROM A CONTAINER
Filed Dec. 14, 1964

INVENTOR
FRANCIS S. COPPOLA

BY *Lowry & Rinehart*

ATTORNEYS

United States Patent Office 3,228,488
Patented Jan. 11, 1966

3,228,488
SCALE WITH INDEX MEANS FOR DETERMINING WEIGHT OF MATERIAL REMOVED FROM A CONTAINER
Francis S. Coppola, 754 S. Main St., Elmira, N.Y.
Filed Dec. 14, 1964, Ser. No. 418,147
7 Claims. (Cl. 177—173)

This invention relates to an index plate for a scale. In particular, the invention relates to an index plate which is employed in combination with a scale to determine the weight variations of materials located within a container or bottle.

The prior art is replete with apparatus which is employed to determine the volume of contents removed from a container. Normally, the container or bottle is provided with an elaborate scale from which the removed contents is determined by reading the scale before and after the contents are removed. Another well known scale represents the dollar and cent value of the container contents. The scale also requires two readings to ascertain the volume change within the container.

The possible error introduced by taking two readings manifestly results in an inaccurate determination of the container contents. Furthermore, if the weight of removed contents is desired, additional computations are required, thereby introducing further error.

It is therefore an object of the instant invention to provide an index apparatus which facilitates determining the weight of material removed from or added to a container.

Another object of the invention is to provide a foolproof index plate which incorporates an index marker, a weight marker and a scale for each of the markers, whereby a scale operator may readily and without error read the proper scale to determine the weight of material removed from or added to a container.

A further object is to provide a rotatable index plate which accurately and efficiently facilitates determining the weight variation of a previously weighed container.

An additional object is to provide an index apparatus which is readily employed with known weighing devices to determine the weight variation of a previously weighed container.

Yet another object of the invention is to provide a rotatable index plate which is inexpensive to manufacture.

The above objects are accomplished by providing the face plate of a known spring scale with an index scale and a weight scale and attaching within an aperture of the face plate a transparent, rotatable index plate having a first indicator mark to read the index scale and a second indicator mark to read the weight scale. A partially filled container is placed on the scale and the appropriate indicator mark of the index plate is aligned with a weight hand of the scale to establish on the index scale an index location which is marked on the bottle. Subsequently, after the container contents have been varied and the container is placed on the spring scale, the index plate is rotated to the previous index location, and the removed contents is determined by reading the displacement of weight hand from the weight indicator marks of the index plate.

With the above and other objects in view that will become apparent as the nature of the invention is better understood, the same consists in the novel form, combination and arrangement of parts hereinafter more fully described, shown in the accompanying drawing, and claimed.

Referring to the drawings.

Figure 1:
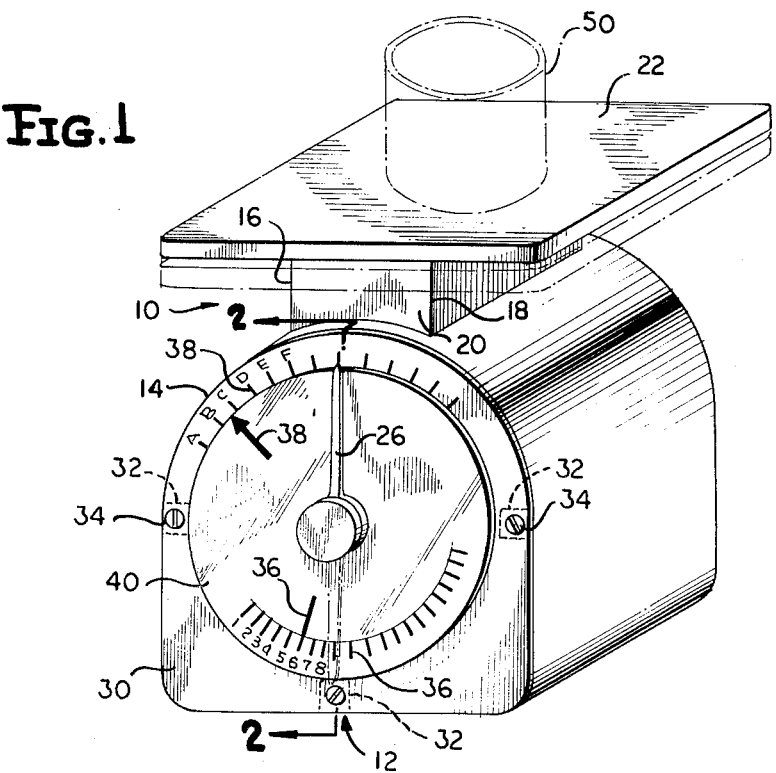
FIGURE 1 is a perspective view of the scale and the rotatable index plate.

As a preferred or exemplary embodiment of the instant invention, the drawing illustrates a scale generally designated 10, which includes a rectangular base 12, an inverted substantially U-shaped housing 14 formed integrally with the base and a rear cover (not shown) joining the base and the U-shaped housing at the rear extremities thereof. The upper end of the housing 14 merges with two vertical panels 16 and 18 which are closed by a front panel 20 and a rear panel (not shown). The panels are attached to the housing 14 by any suitable connection (not shown).

A platform 22 is positioned above the panels and is operatively connected to a threaded shaft 24 by means of a spring, to cause a rotation of the shaft in direct proportion to the weight carried by the platform 22. Any suitable connection between the platform 22 and the shaft 24, such as that disclosed in U.S. Patent 1,138,687, may be employed. The particular spring and connecting apparatus forms no part of the instant invention. A hand 26 is threaded on the shaft 24 and adjustably positioned thereon by a lock nut 28.

The front of the scale is closed by a face plate 30 which is attached to the housing 14 by a suitable number of brackets 32 and a corresponding number of screws 34 which extend through the face plate and threadingly engage the brackets. The lower portion of the face plate 30 is provided with an annular extending number scale 36, and radially outwardly the face plate is provided with an annular letter scale 38.

Figure 2:
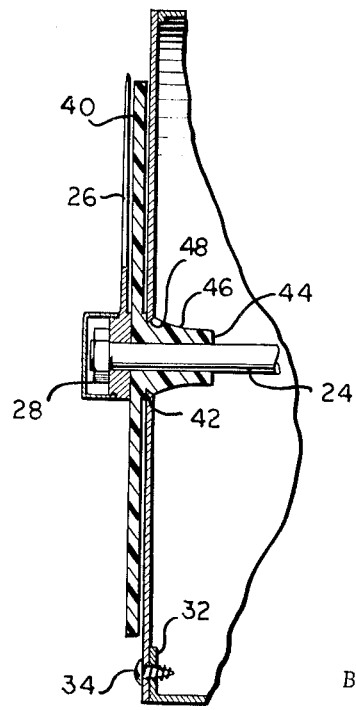
FIGURE 2 is a sectional view along line 2—2 of FIGURE 1, illustrating the rotatable attachment between the index plate and the scale face plate.

To facilitate attachment of a transparent index plate 40, the face plate 30 is bored to provide a central aperture 42 through which a hollow cylindrical extension 44 of the index plate extends. As shown in FIGURE 2, the periphery of the cylindrical extension 44 includes a conical section 46 and an annular recess 48. The index plate 40 is readily attached to the face plate 30 by locating the narrow extremity of the conical section 46 within the aperture 40 and forcing the wide extremity of the conical section through the aperture until the annular recess 48 is located within the central aperture 42 of the face plate 30.

The transparent index plate 40 includes a first indicator mark in the form of a line 36' and a second mark, arrow 38'. The line 36' is employed in cooperation with the number scale 36 to determine the weight of material removed from a previously weighed container. The arrow 38' and the letter scale 38 are employed to establish an index letter as will be explained hereinafter.

The employment of an annular scale and an annular letter scale at different radial dispositions eliminates the possibility of reading the wrong scale. Additional insurance against improper readings is realized by providing the index plate with different scale reading markings, i.e., a line 36' which cooperates with the number scale 36 and an arrow 38' which cooperates with the letter scale 38. By radially displacing the two annular scales and employing markings on the index plate, each scale may be extended to 360° without appreciably increasing the possibility of improperly reading the wrong scale.

The above described apparatus determines the weight of the material removed from a container in the following manner. A partially filled container 50 is placed on the platform 22, causing the hand 26 to rotate in a clockwise direction. After the rotation of the hand 26 has ceased, the index plate is rotated to position the line 36' along the centerline of the hand 26. When the index plate 40 is located in this position, the arrow 38' provides an index reading on the letter scale 38. This letter is then recorded on the container 50.

The weight of the material added to or removed from the container 50 may be readily ascertained at any time in the future by reading the index letter on the container and positioning the arrow 38' of the plate 40 at the appropriate letter of the scale 30. This rotation of the index plate 40 positions the line 36' at its original location. Any weight variations in the container material is reflected by the displacement of the hand 26 from the line 36'.

While there is herein described the preferred embodiment of the apparatus, it is to be understood that changes may be made therein without departing from the spirit and scope of the invention as claimed.

What is claimed is:

1. Apparatus for determining the weight of material removed from a container comprising:
    a scale having a platform on which the container is placed;
    a hand movable in response to and in direct proportion to the weight placed on the platform;
    a fixed panel carried by the scale;
    a weight scale and an index scale located on the panel;
    and a movable index member in the form of a circular transparent disc carried by said scale and provided with a scale reading mark and an index reading mark, said disc overlying the weight scale, whereby when the container is placed on the platform, the index member is moved to align the scale reading mark with the hand to establish with said index mark an index position on the index scale, thereby facilitating a subsequent determination in weight variation of the material within the container by returning the index reading mark to the index position and reading the displacement of the hand from the scale reading mark.

2. The appaartus as set forth in claim 1, wherein said hand extends through an aperture formed by the panel.

3. The apparatus as set forth in claim 2, wherein said index member is rotatably mounted in said aperture.

4. The apparatus as set forth in claim 3, wherein said weight scale and said index scale are annularly disposed.

5. The apparatus as set forth in claim 1, wherein said weight scale is located within the periphery of said index member.

6. The apparatus as set forth in claim 1, wherein said index scale is located along the periphery of the index member.

7. The apparatus as set forth in claim 6, wherein the index reading mark is an arrow and the weight reading mark is a line.

References Cited by the Examiner

UNITED STATES PATENTS

| | | | |
|---|---|---|---|
| 1,278,788 | 9/1918 | Theobald | 177—173 |
| 1,371,371 | 3/1921 | Hinsman | 116—129 |
| 1,407,987 | 2/1922 | Crane | 177—166 |
| 1,537,158 | 5/1925 | Chatillon | 116—129 |
| 2,559,493 | 7/1951 | Bird | 116—129 |
| 2,870,670 | 1/1959 | Norwood | 235—64.7 X |
| 2,888,196 | 5/1959 | Welch et al. | 235—83 X |

LEO SMILOW, *Primary Examiner.*

G. J. PORTER, *Assistant Examiner.*